United States Patent
Olson et al.

(10) Patent No.: US 7,791,839 B2
(45) Date of Patent: Sep. 7, 2010

(54) THERMALLY-ASSISTED PERPENDICULAR MAGNETIC RECORDING SYSTEM WITH WRITE POLE SURROUNDING AN OPTICAL CHANNEL AND HAVING RECESSED POLE TIP

(75) Inventors: James Terrence Olson, Santa Cruz, CA (US); Barry Cushing Stipe, San Jose, CA (US); Timothy Carl Strand, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 994 days.

(21) Appl. No.: 11/532,084

(22) Filed: Sep. 14, 2006

(65) Prior Publication Data

US 2008/0068748 A1    Mar. 20, 2008

(51) Int. Cl.
*G11B 5/60* (2006.01)
*G11B 5/127* (2006.01)

(52) U.S. Cl. .............................. 360/125.31; 360/125.03; 360/59

(58) Field of Classification Search .............. 360/125.3, 360/125.31, 59, 125.03; 369/13.13, 13.33
See application file for complete search history.

(56) References Cited

U.S. PATENT DOCUMENTS

| | | |
|---|---|---|
| 5,583,727 A | 12/1996 | Parkin |
| 5,986,978 A | 11/1999 | Rottmayer et al. |
| 6,016,290 A | 1/2000 | Chen et al. |
| 6,130,779 A | 10/2000 | Carlson et al. |
| 6,233,206 B1 | 5/2001 | Hamann et al. |
| 6,762,977 B1 * | 7/2004 | Gage et al. ............... 369/13.13 |
| 6,809,908 B1 * | 10/2004 | Ito et al. ..................... 360/317 |

(Continued)

FOREIGN PATENT DOCUMENTS

JP    57113406    7/1982

(Continued)

OTHER PUBLICATIONS

Thio et al., "Enhanced light transmission through a single subwavelength aperture", Optics Letters, vol. 26, Issue 24, pp. 1972-1974 (2001).

(Continued)

*Primary Examiner*—Jefferson Evans
(74) *Attorney, Agent, or Firm*—Thomas R. Berthold (57) ABSTRACT

A thermally-assisted perpendicular magnetic recording head and system has a head carrier that supports an optical channel for the transmission of radiation to the recording layer, a write pole for directing a magnetic field to the recording layer, and an electrical coil for inducing the magnetic field from the write pole. The optical channel has a radiation exit face with an aperture at the recording-layer-facing surface of the head carrier. The write pole has a pole tip with an end face that is recessed from the recording-layer-facing surface. The write pole tip is tapered down to the end faces. The pole tip taper and the recession of the end face concentrates the write field at the middle of the perpendicular magnetic recording layer where the radiation from the optical channel is incident. The characteristic dimension of the aperture and the spacing between the aperture and the recording layer are both less than the wavelength of the radiation. The radiation source may be a laser diode mounted to the head carrier.

29 Claims, 6 Drawing Sheets

U.S. PATENT DOCUMENTS

| | | | |
|---|---|---|---|
| 6,873,576 B1* | 3/2005 | Van Kesteren | 369/13.17 |
| 6,876,603 B2 | 4/2005 | Fuji et al. | |
| 6,881,497 B2 | 4/2005 | Coffey et al. | |
| 6,944,112 B2 | 9/2005 | Challener | |
| 6,982,844 B2 | 1/2006 | Rettner et al. | |
| 7,027,700 B2* | 4/2006 | Challener | 385/129 |
| 7,068,453 B2 | 6/2006 | Terris et al. | |
| 7,289,422 B2* | 10/2007 | Rettner et al. | 369/300 |
| 7,310,206 B2* | 12/2007 | Liu et al. | 360/317 |
| 7,440,384 B2* | 10/2008 | Eppler | 369/112.27 |
| 7,483,229 B2* | 1/2009 | Rausch et al. | 360/59 |
| 7,492,673 B2* | 2/2009 | Ueyanagi | 369/13.32 |
| 2003/0165170 A1* | 9/2003 | Hatakoshi et al. | 372/46 |
| 2004/0081030 A1 | 4/2004 | Jang et al. | |
| 2005/0052771 A1 | 3/2005 | Rausch et al. | |
| 2005/0071859 A1 | 3/2005 | Coehoorn et al. | |
| 2006/0024529 A1* | 2/2006 | Murakami | 428/810 |
| 2006/0067001 A1* | 3/2006 | Hsu et al. | 360/234.3 |
| 2006/0090178 A1* | 4/2006 | Stipe | 720/659 |
| 2006/0119971 A1* | 6/2006 | Kurita et al. | 360/69 |
| 2008/0151427 A1* | 6/2008 | Poon et al. | 360/235.4 |
| 2008/0225673 A1* | 9/2008 | Hasegawa et al. | 369/112.23 |
| 2009/0188891 A1* | 7/2009 | Tanaka et al. | 216/22 |

FOREIGN PATENT DOCUMENTS

| | | |
|---|---|---|
| JP | 2001357572 | 8/2006 |

OTHER PUBLICATIONS

Matteo et al., "Spectral analysis of strongly enhanced visible light transmission through single C-shaped nanoapertures", Appl. Phys. Lett., vol. 85(4), pp. 648-650 (2004).

"Thermally-Assisted Magnetic Recording", IBM Technical Disclosure Bulletin, vol. 40, No. 10, Oct. 1997, p. 65.

"Data Recording at Ultra High Density", IBM Technical Disclosure Bulletin, vol. 39, No. 7, Jul. 1996, p. 237.

Nakagawa et al., "Development of High Density Perpendicular Magnetic Recording System Using a Probe Head of Sharpened Optical Fiber", IEEE Transactions on Magnetics, vol. 35, No. 5, Sep. 1999, pp. 3130-3132.

* cited by examiner

THERMALLY-ASSISTED PERPENDICULAR MAGNETIC RECORDING SYSTEM WITH WRITE POLE SURROUNDING AN OPTICAL CHANNEL AND HAVING RECESSED POLE TIP

TECHNICAL FIELD

This invention relates generally to a thermally-assisted magnetic recording (TAMR) system, in which data are written while the magnetic recording layer is at an elevated temperature, and more specifically to a TAMR system and write head for perpendicular recording.

BACKGROUND OF THE INVENTION

Perpendicular magnetic recording, wherein the recorded bits are stored in the generally planar recording layer in a generally perpendicular or out-of-plane orientation (i.e., other than parallel to the surface of the recording layer), is a promising path toward ultra-high recording densities in magnetic recording systems, such as hard disk drives. A common type of perpendicular magnetic recording disk drive uses a "dual-layer" disk. This type of disk drive is shown schematically in FIG. 1. Write current passes through a coil of the write head to generate a magnetic field at the write pole. The dual-layer disk includes a perpendicular magnetic data recording layer on a "soft" or relatively low-coercivity magnetically permeable underlayer (SUL) formed on the disk substrate. The SUL serves as a flux return path for the magnetic field from the write pole to the return pole of the write head. The recording layer has perpendicularly recorded magnetizations or magnetized regions that form a data track, with adjacent regions in the data track having opposite magnetization directions, as represented by the arrows. A sense current passes through the read head, typically a magnetoresistive (MR) read head, such as a tunneling MR (TMR) read head in which sense current passes perpendicularly through the layers making up the head. The magnetic transitions between adjacent oppositely-directed magnetized regions cause changes in electrical resistance that are detectable by the read head as data bits. A shield of magnetically permeable material prevents fields from magnetizations other than the magnetization being read from reaching the read head.

Figure 1:
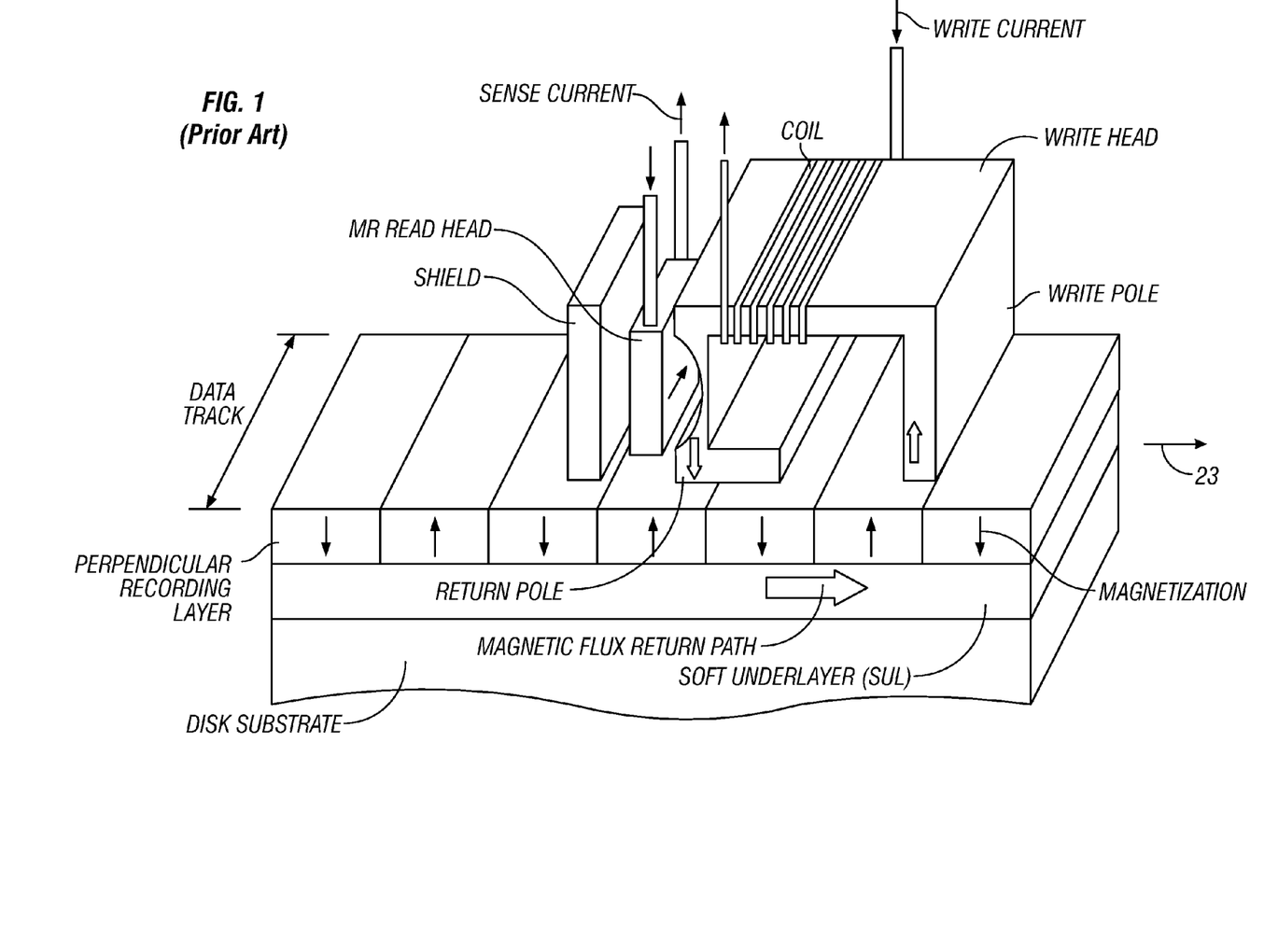
FIG. 1 is a schematic of a prior art type of perpendicular magnetic recording disk drive that uses a "dual-layer" disk.

The read head and write head are typically formed as an integrated read/write head patterned on the trailing surface of a head carrier, such as a slider with an air-bearing surface (ABS) that allows the slider to ride on a thin film of air above the surface of the rotating disk, with the direction of the disk relative to the write head being shown by arrow 23. The slider is attached to an actuator arm by a suspension and positioned very close to the disk surface by the suspension. The actuator moves the slider across the disk surface so that the read/write head can access the data tracks. There are typically a stack of disks in the disk drive with a slider-suspension assembly associated with each disk surface in the stack.

The magnetic material (or media) for the recording layer on the disk is chosen to have sufficient coercivity such that the magnetized data bits are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) may be required. However, increasing $K_u$ also increases the short-time switching field, $H_0$, which is the field required to reverse the magnetization direction, which for most magnetic materials is somewhat greater than the coercivity or coercive field measured on much longer time-scales. Obviously, $H_0$ cannot exceed the write field capability of the recording head, which currently is limited to about 15 kOe for perpendicular recording.

Since it is known that the coercivity of the magnetic material of the recording layer is temperature dependent, one proposed solution to the thermal stability problem is thermally-assisted magnetic recording (TAMR), wherein the magnetic material is heated locally to near or above its Curie temperature during writing to lower the coercivity enough for writing to occur, but where the coercivity/anisotropy is high enough for thermal stability of the recorded bits at the ambient temperature of the disk drive (i.e., the normal operating or "room" temperature). Several TAMR approaches have been proposed, primarily for the more conventional longitudinal or horizontal recording, wherein the recorded bits are oriented generally in-the-plane of the recording layer.

A "wide-area" heater has been proposed to heat a region of the disk wider than the data track to be recorded. A wide-area heater is relatively easy to implement in a conventional recording head structure and has the additional advantage that it heats the data track very efficiently and thus minimizes the required heater temperature for a given required media temperature. TAMR systems with wide-area heaters include systems that use a laser or ultraviolet lamp to do the heating, as described in "Data Recording at Ultra High Density", *IBM Technical Disclosure Bulletin*, Vol. 39, No. 7, July 1996, p. 237; "Thermally-Assisted Magnetic Recording", *IBM Technical Disclosure Bulletin*, Vol. 40, No. 10, October 1997, p. 65; and U.S. Pat. Nos. 5,583,727 and 5,986,978. One problem with a wide-area heater is adjacent-track interference (ATI). Because adjacent tracks are also being heated, the stray magnetic field from the write head can erase data previously recorded in the adjacent tracks. Also, even in the absence of a magnetic field, the thermal decay rate in adjacent tracks is accelerated over that at ambient temperature and thus data loss may occur.

A proposed solution for the ATI problem is a "small-area" heater that heats only the data track. U.S. Pat. No. 6,493,183 describes a TAMR disk drive, also for longitudinal recording, wherein the write head includes an electrically resistive heater located in the write gap between the pole tips for locally heating just the data track. A disadvantage of the small-area resistive heater is that due to the relatively inefficient heat transfer the heater temperatures required to reach a desired media temperature are very high. U.S. Pat. No. 6,982,844 describes a TAMR disk drive, also for longitudinal recording, that uses an optical channel with an aperture that emits laser radiation to heat just the data track.

What is needed is a TAMR system and write head for perpendicular magnetic recording.

SUMMARY OF THE INVENTION

The invention is a thermally-assisted perpendicular magnetic recording head and system. A head carrier supports a magnetic write pole and an optical channel for the transmission of radiation to the recording layer with the optical channel having a radiation exit face at the recording-layer-facing surface of the head carrier. The electrical coil for generating write-current pulses may be a helical coil that is wrapped around the write pole or a flat coil surrounding the write pole. The write pole has a pole tip with an end face that is recessed from the recording-layer-facing surface. The write pole tip is tapered down to the end faces. The pole tip taper and the recession of the end face concentrates the write field at the middle of the perpendicular magnetic recording layer where the radiation from the optical channel is incident.

The exit face of the optical channel has an aperture through which the radiation exits to heat the recording layer. The characteristic dimension of the aperture is less than the wavelength of the radiation. The exit face with the aperture acts as a near field transducer with the spacing between the aperture and the recording layer being less than the wavelength of the radiation. The radiation source may be a laser diode mounted to the head carrier. A cladding layer is located between the optical channel and the write pole to minimize optical power loss from the optical channel to the metallic material of the write pole. The cladding layer may be made thinner near the pole tip so that the gap between the pole tip portions can be made smaller and the write field concentrated to a smaller surface area at pole tip end face. The heat from the optical channel is confined to a single data track to prevent accidental erasure of adjacent tracks.

After a region of the recording layer in the data track has been exposed to the write field from the write pole and heat from the optical channel it becomes written or recorded when it cools to below the Curie temperature. The relatively large write pole tip supplies an orienting magnetic field over a relatively broad area of the recording layer while the data bits are written at the trailing (cooling) edge of the heated region.

For a fuller understanding of the nature and advantages of the present invention, reference should be made to the following detailed description taken together with the accompanying figures.

DETAILED DESCRIPTION OF THE INVENTION

Figure 2:
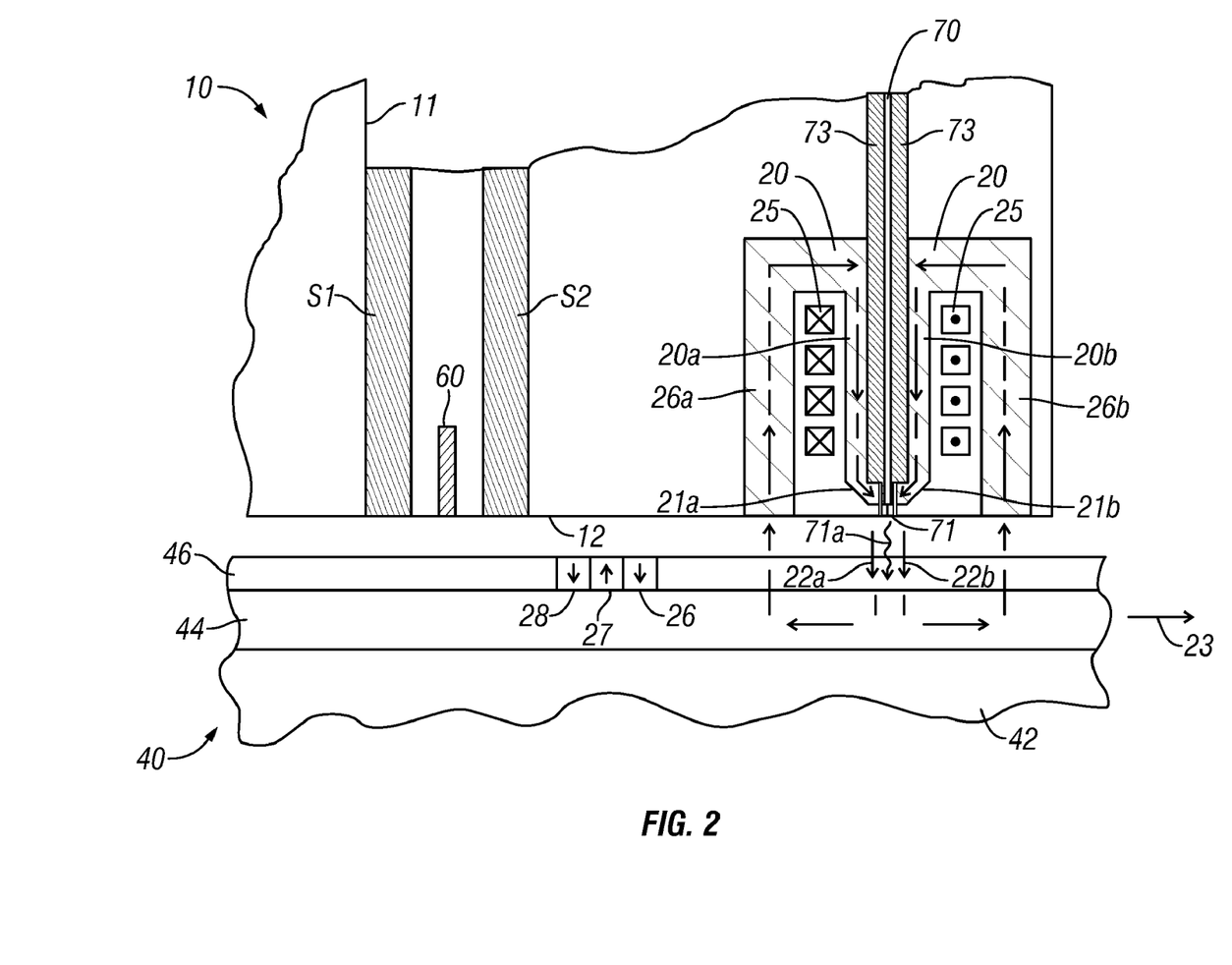
FIG. 2 is a sectional view through a portion of the head carrier and associated perpendicular magnetic recording disk for one implementation of a TAMR disk drive according to the invention.

FIG. 2 is a sectional view through a portion of the head carrier and associated perpendicular magnetic recording medium according to one implementation of this invention. The recording medium, i.e., disk 40, includes a substrate 42, the SUL 44, and a perpendicular magnetic recording layer 46. The SUL 44 may be any alloy material suitable as the magnetically-permeable flux-return path, such as NiFe, FeAlSi, FeTaN, FeN, CoFeB and CoZrNb. The recording layer 46 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The recording layer 46 may also be an $L1_0$ ordered alloy such as FePt or FeNiPt. The disk 40 would also typically include a protective overcoat (not shown) over the recording layer 46.

The head carrier 10 has a trailing surface 11 and a recording-layer-facing surface 12 oriented generally perpendicular to trailing surface 11. The head carrier is typically formed of a composite material, such as a composite of alumina/titanium-carbide ($Al_2O_3$/TiC), and supports the read and write elements typically formed as a series of thin films and structures on its trailing surface 11. The surface 11 is called the trailing surface because of the direction 23 of the disk 40 relative to head carrier 10. In a disk drive embodiment the head carrier is an air-bearing slider, surface 11 is the end of the slider on which the thin films are formed, and surface 12 is the air-bearing surface (ABS) of the slider. The ABS 12 is the recording-layer-facing surface of the slider that faces the disk and is shown without the thin protective overcoat typically present in an actual slider. The recording-layer-facing surface shall mean the surface of the head carrier that is covered with a thin protective overcoat, the actual outer surface of the head carrier if there is no overcoat, or the outer surface of the overcoat. FIG. 2 is not drawn to scale because of the difficulty in showing the very small features.

The head carrier 10 supports a magnetoresistive read head 60 located between shields S1 and S2; a perpendicular write head with a main or write pole 20, a first flux return pole 26a, a second flux return pole 26b, and an electrically conductive coil 25; and a waveguide or optical channel 70. The write pole 20 has an end face 21a that faces the surface 12 but is recessed from surface 12 for the reasons described below. The end face 21a is preferably the end face of a pole tip 21 that forms a narrowed or tapered end region of the write pole 20. The write pole is formed of conventional high-moment material, such as a FeCoNi alloy. The write coil 25 is shown as a helical coil wrapped around write pole 20 with the electrical current directions being shown as into the paper by the coil cross-sections marked with an "X" and out of the paper by the coil cross-sections marked with a solid circle. When write-current pulses are directed through coil 25, the write pole tip 21 directs magnetic flux, represented by arrows 22a, 22b, to the recording layer 46. The dashed lines with arrows show the flux return path through the SUL 44 back to return poles 26a, 26b.

The optical channel 70 extends through the write pole 20 and is substantially surrounded by the write pole 20. In the implementation of FIG. 2, the write pole 20 has two portions 20a, 20b spaced on opposite sides of optical channel 70. The optical channel 70 has a radiation exit face 71 that is located substantially at surface 12. The optical channel 70 directs radiation, as represented by wavy arrow 71a, to the recording layer 46 to heat the recording layer nearly to or above the Curie temperature of the material making up the recording layer 46. During writing, the recording layer 46 moves relative to the head carrier 10 in the direction shown by arrow 23. The transitions between recorded regions (such as previously recorded regions 26, 27 and 28 in FIG. 2) represent written data "bits" that can be read by the read head 60. The unshaded regions in FIG. 2, with the exception of optical channel 70, represent insulating material, typically alumina.

Figure 3:
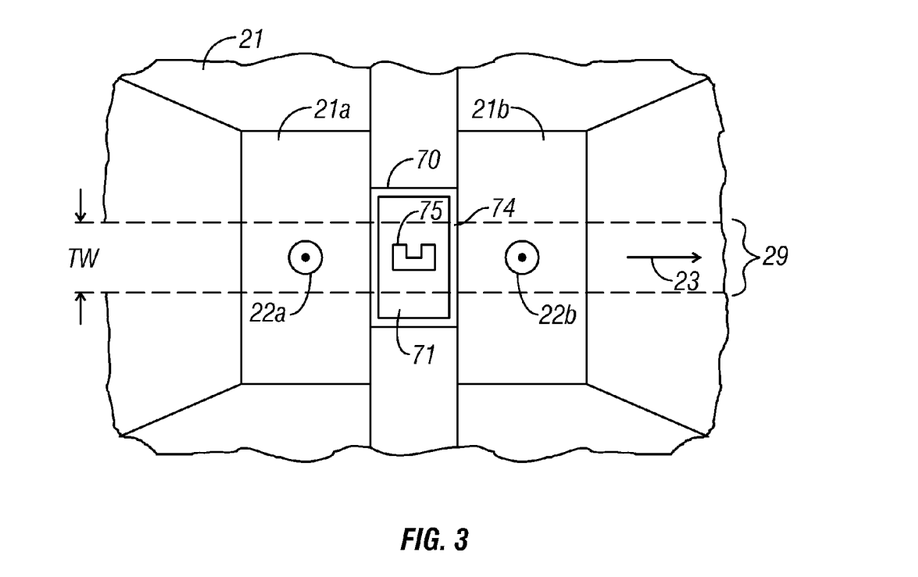
FIG. 3 is a view of the write head and optical channel as viewed from the disk for a portion of the head carrier shown in FIG. 2.

FIG. 3 is a view of the write head and optical channel as viewed from the disk 40. The optical channel 70 directs radiation to the recording layer 46 through an aperture 75 in radiation exit face 71 to heat the recording layer above the Curie temperature of the material making up the recording layer 46. The width of the heated region on the disk created by the near-field optical spot through aperture 75 substantially defines the track-width TW of the data tracks in the recording layer 46. The write pole tip 21 directs magnetic flux (arrow ends 22a, 22b) through pole tip end faces 21a, 21b perpendicularly (i.e., "out of the paper" in FIG. 3) to the recording layer 46. The magnetic field is much wider than the TW, typically many tracks wide. The direction 23 is called the down-track direction and the direction perpendicular to the down-track direction (and parallel to the track-width TW) is called the cross-track direction.

In TAMR, wherein heating from radiation through optical channel 70 temporarily lowers the coercivity $H_c$ of the recording layer 46 so that the magnetic regions may be oriented by the write field from write pole 20, the heat must be confined to a single data track to prevent accidental erasure of adjacent tracks. The magnetic regions become oriented by the write field if the write field $H_W$ is greater than $H_c$. After a region of the recording layer in the data track has been exposed to the write field from the write pole 20 and heat from the optical channel 70 it becomes written or recorded when it cools to below the Curie temperature. In conventional perpendicular magnetic recording, i.e., without heating of the recording layer, the sharpness of the magnetic transitions, and thus the bit density, are determined by the write field gradient $dH_W/dx$, where x is the distance along the track. However, in TAMR, because $H_c$ of the recording layer decreases with increasing temperature T, the sharpness of the magnetic transition is determined by a combination of the write field gradient $dH_W/dx$ and the temperature gradient $dT/dx$ at the trailing edge of the heated region according to $dH_{eff}/dx=dH_W/dx+dH_c/dT*dT/dx$. Thus it is necessary to have a high temperature gradient to define the in-track bit density but it is not necessary to have an overlapping high write field gradient. The relatively large pole tip 21 supplies an orienting magnetic field over a relatively broad area of the recording layer while the data bits are written at the trailing (cooling) edge of the heated region. The relatively large recession between the write pole tip end faces 21a, 21b and the recording layer 46 does not present a problem in writing because a write field gradient is not used in the writing process.

Figure 4:
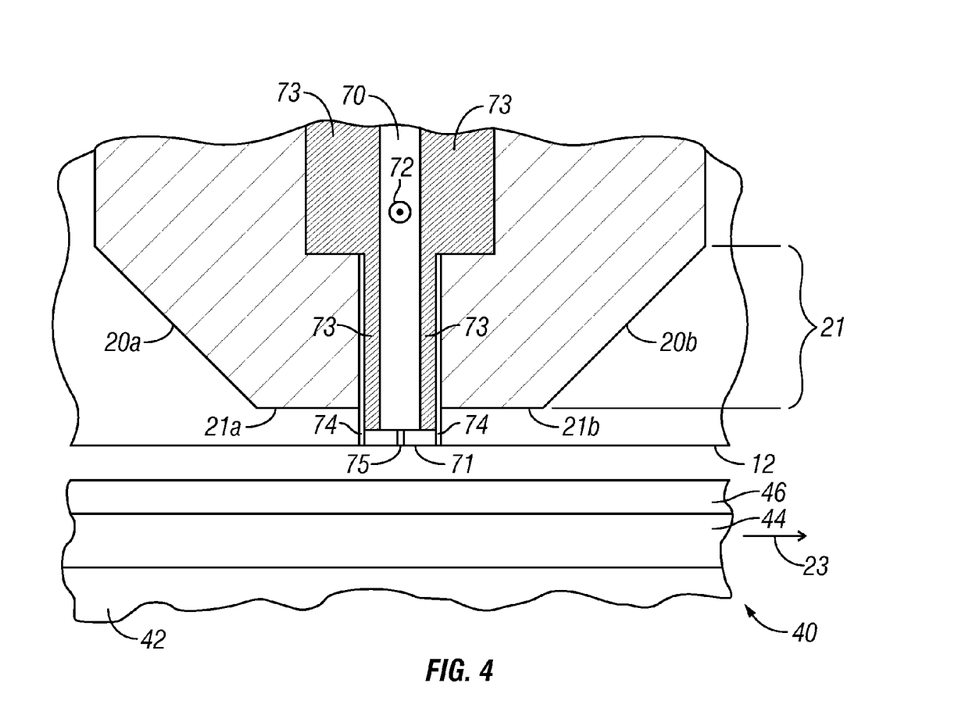
FIG. 4 is an enlarged sectional view of a portion of FIG. 3 showing the ends of the write pole and optical channel in cooperation with the disk.

FIG. 4 is an enlarged sectional view showing the ends of the write pole and optical channel in cooperation with the disk. The write pole tip 21 is tapered from write poles 20a, 20b down to respective end faces 21a, 21b. The end faces 21a, 21b are recessed from surface 12. The taper angle and the amount of recession are selected, based on mathematical modeling, to locate the maximum field from the write pole tip 21 at the central region of the recording layer 46 where the radiation from optical channel 70 is incident, and to minimize the write field gradient. This allows the temperature gradient to define the sharpness of the magnetic transitions. In one example, for a write pole made of a material with 2.4 Tesla, a taper angle of approximately 52 degrees, and a recession of about 300 nm, a field of greater than 10 kOe can be obtained at the recording layer 46.

As shown in FIG. 4, the thin film waveguide or optical channel 70 directs radiation polarized in the direction represented by arrow head 72 (in and out of the page). Alternatively, the polarization direction could be in the plane of the page. The optical channel 70 is formed of a core material such as glass, quartz or another dielectric material that is transmissive to radiation at the wavelength of the laser (for example $Ta_2O_5$) and is surrounded by a dielectric cladding layer 73 (for example $SiO_2$ or $Al_2O_3$) of lower refractive index than the core material. In one example, the optical channel 70 may be approximately 250 nm in diameter or cross-sectional dimension with a 500 nm thick cladding layer 73 surrounding it and located between the optical channel 70 and the write poles 20a, 20b. Near the end of the optical channel 70, in the region where the optical channel 70 passes through the pole tip 21, the cladding layer 73 may be made thinner so that the gap between the two pole tip portions can be made smaller. This concentrates the write field to a smaller surface area at end faces 21a, 21b. As shown in FIG. 4, the cladding layer thickness is reduced from about 500 nm to about 125 nm. This reduced cladding layer thickness may lead to optical power dissipation into the metallic material of the write pole tip 21 so this end section of the optical channel 70 corresponding to the length of write pole tip 21 is kept short, e.g., about 1.5 microns. The cladding layer may be completely removed in this end section to bring the two pole tip portions even closer together with the tradeoff of additional optical power dissipation. Optical power dissipation may be reduced with the use of a film 74, such as gold or copper, on the pole tip portions surrounding the optical channel 70. Such a film could also be used in the upper region of optical channel 70 to reduce optical power dissipation. The radiation exit face 71 of optical channel 70 has an aperture 75 through which the radiation exits to heat the recording layer 46.

If the radiation source is light from a CD-RW type laser diode the wavelength is approximately 780 nm. The laser diode may be located on the head carrier 10. Alternatively, laser radiation may be delivered from a source off the slider through an optical fiber or waveguide. At the end of optical channel 70 is the exit face 71 that acts as a near-field optical transducer. The exit face may be a radiation-reflective film with an aperture 75 in the form of a ridged slot waveguide. The film is preferably a metal such as gold, silver, chromium or another suitable alloy or multilayer structure. The aperture 75 may be formed by etching the film by a focused ion beam (FIB) or by e-beam lithography.

The aperture 75 is subwavelength-sized, i.e., its diameter if it is circularly-shaped or the dimension of its smallest feature if it is non-circular, is less than the wavelength of the incident laser radiation and preferably less than one-half the wavelength of the laser radiation. In the example of FIG. 4, if the radiation source is a laser diode with a wavelength of 780 nm, the spacing between surface 12 and the top surface of disk 40 is approximately 8 nm, the thickness of the disk overcoat (not shown) is about 3 nm, and the thickness of the recording layer 46 is about 12 nm, then the spacing between the aperture 75 and the middle of recording layer 46 would be about 17 nm. If in this example the write pole tip 21 end faces 21a, 21b are recessed about 300 nm, then the pole tip end faces 21a, 21b would be located about 317 nm from the middle of recording layer 46.

Figure 5:
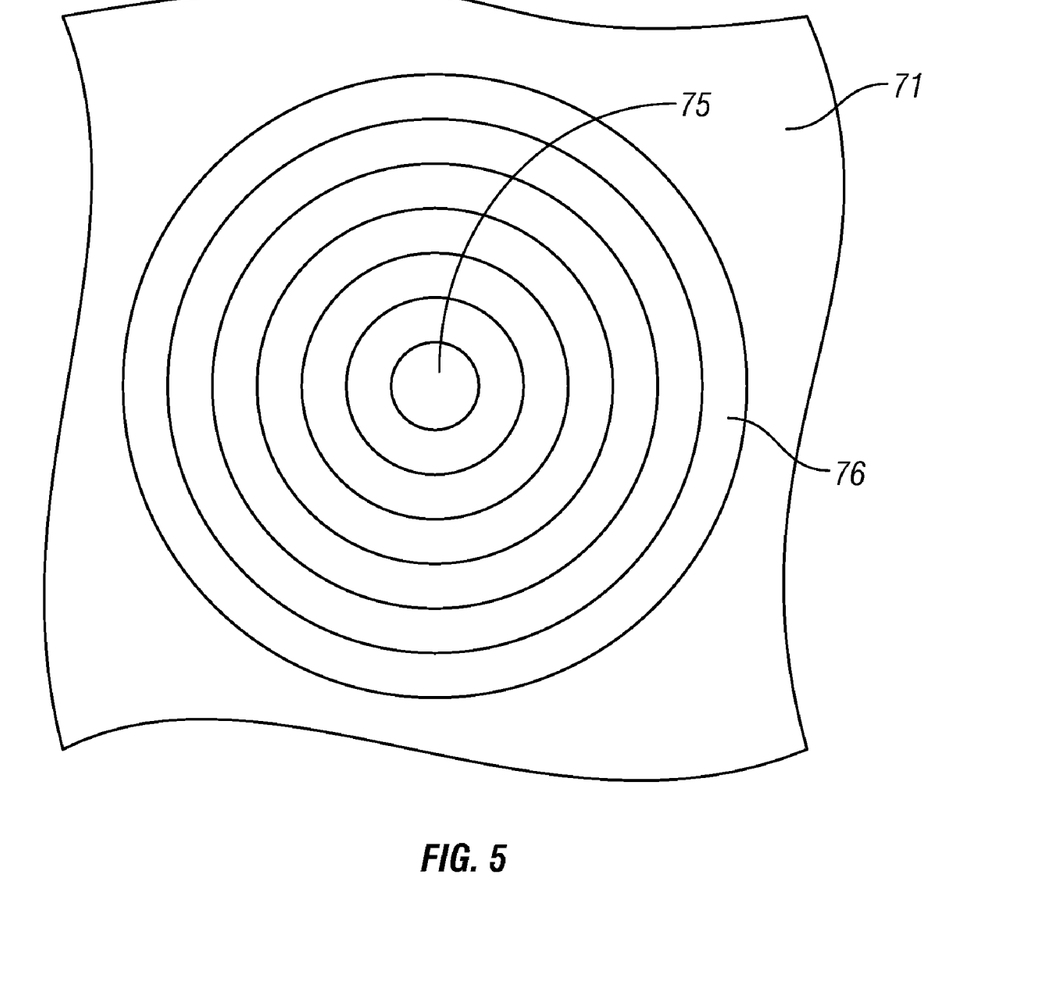
FIG. 5 is a view of the output side of a circular aperture as seen from the disk and shows a modification wherein the metal film that forms the exit face of the optical channel has a periodic corrugation or ridge surface structure.

FIG. 5 is a view of the output side of a circular aperture 75 as seen from the disk and shows a modification wherein the metal film that forms the exit face 71 and surrounds the aperture 75 has a periodic corrugation or ridge surface structure, as depicted by the concentric circular pattern 76. It is known that optical transmission through a subwavelength aperture in a metal film is enhanced when the incident radiation is resonant with surface plasmons at a corrugated metal surface surrounding the aperture. Thus features such as ridges or trenches in the metal film serve as a resonant structure to further increase the emitted radiation output from the aperture beyond what it would be in the absence of these features. The effect is a frequency-specific resonant enhancement of the radiation emitted from the aperture, which is then directed onto the recording layer, with the recording layer being positioned within the near-field. This resonant enhancement is described by Thio et al., "Enhanced light transmission through a single subwavelength aperture", *Optics Letters*, Vol. 26, Issue 24, pp. 1972-1974 (2001); and in U.S. Pat. No. 6,975,580.

Figure 6A:
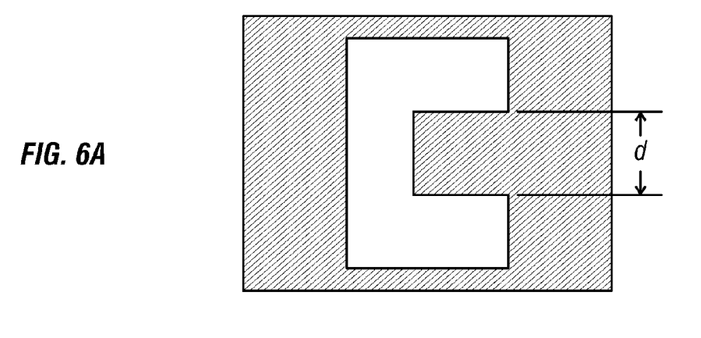
FIGS. 6A-6C illustrate various shapes for the aperture on the exit face of the optical channel; in particular a C-shaped aperture (FIG. 6A), an H-shaped aperture (FIG. 6B) and a bowtie-shaped aperture (FIG. 6C).
Figure 6B:
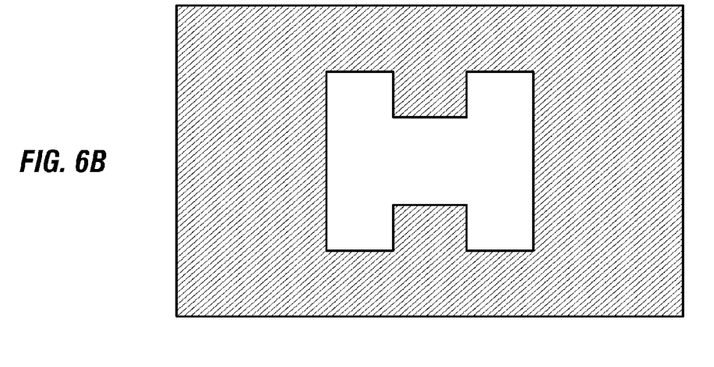
Figure 6C:
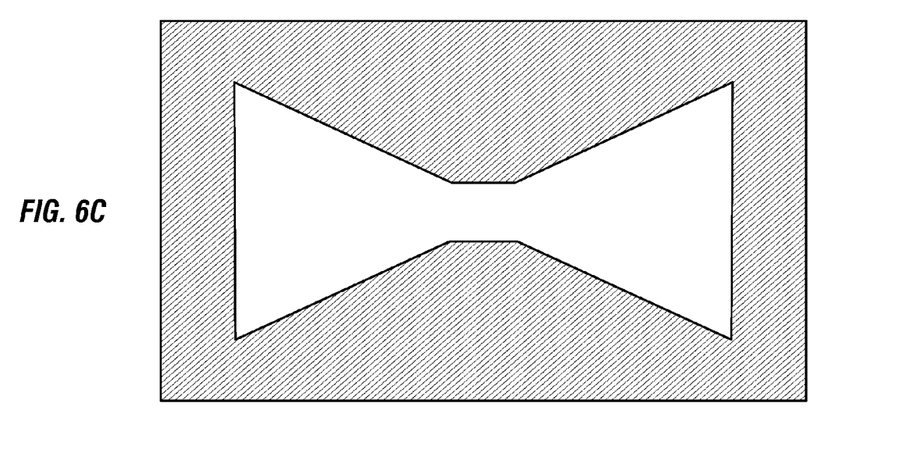

The aperture 75 shown in FIG. 3 is a "C"-shaped aperture with a characteristic dimension "d", as shown in the enlarged view of FIG. 6A. The near-field spot size is determined by the characteristic dimension d, which is the dimension of the smallest feature of the aperture. The resonant wavelength depends on the characteristic dimension of the aperture as well as the electrical properties and thickness of the thin film surrounding the aperture. This is discussed by J. A. Matteo et. al., *Applied Physics Letters*, Volume 85(4), pp 648-650 (2004) for a C-shaped aperture. FIGS. 6B-6C illustrate other shapes for the aperture, in particular, an H-shaped aperture (FIG. 6B) and a bowtie-shaped aperture (FIG. 6C). The surface plasmon resonant excitation around these types of apertures enhances the radiation transmission.

Figure 7:
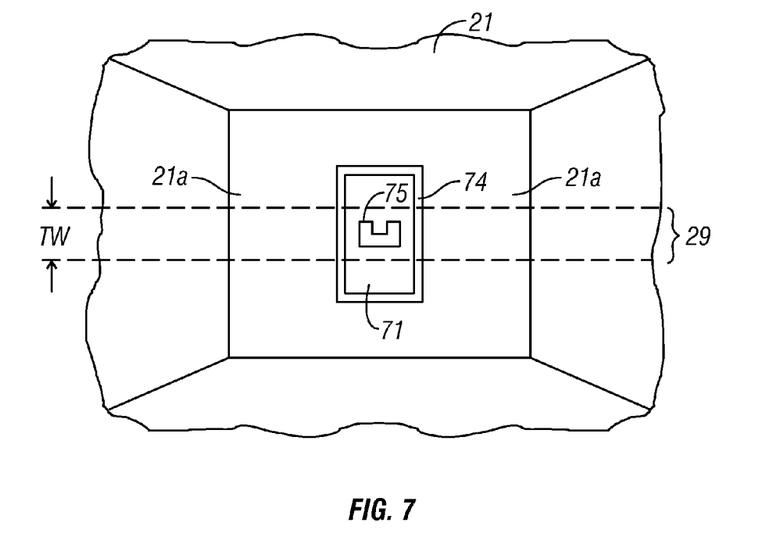
FIG. 7 is a view of the write head and optical channel as viewed from the disk for a portion of the head carrier wherein the write pole completely surrounds the optical channel.

The views of FIGS. 2 and 3 show an implementation wherein the head structure has a "split" pole, i.e., write pole portions 20a, 20b spaced on opposite sides of and substantially surrounding the optical channel 70. FIG. 7 shows a similar view, but for an implementation of a "wrap-around" pole wherein the write pole completely surrounds the optical channel 70. The wrap-around pole will generate a larger field than the split pole. In the two implementations shown by FIGS. 3 and 7, because the polarization of the radiation in optical channel 70 is in the cross-track direction, the write poles should be kept further away from the optical channel 70 in this direction, which may be accomplished with a thicker cladding layer 74. This is because the light will interact more strongly with the metallic material of the write poles placed in the polarization direction.

Figure 8:
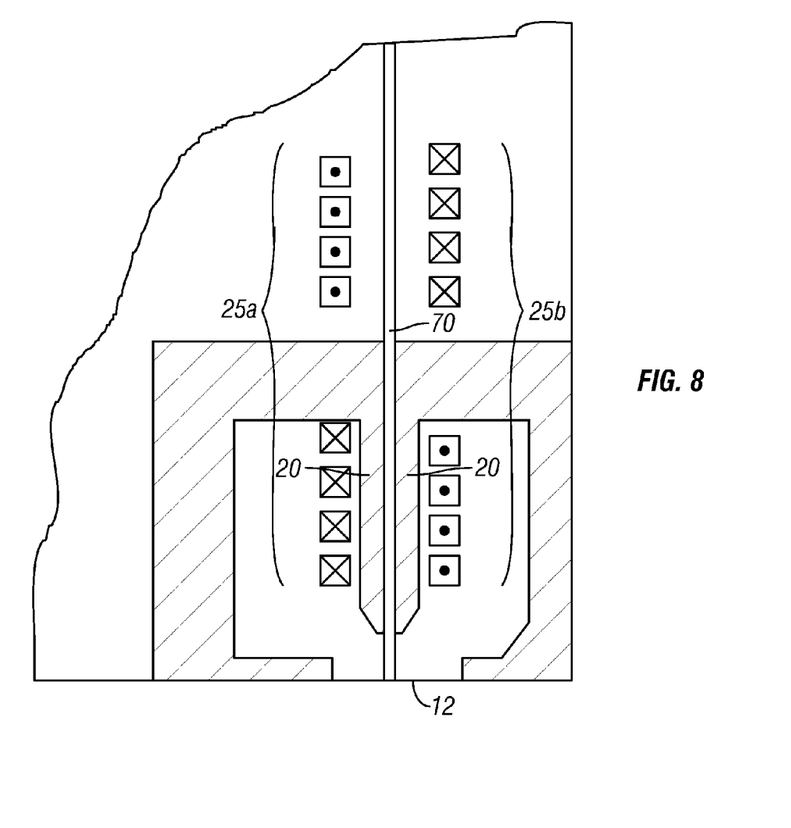
FIG. 8 shows a magnetic write head structure according to the invention in the form of a dual pancake coil.

The implementation of FIG. 2 shows the write pole 20 with two return poles 26a, 26b. However, the write pole may have a single return pole, as depicted in the prior art schematic of FIG. 1. Also, the coil 25 is a helical coil wrapped around write pole 20. However, the head structure may include a single flat or "pancake" coil or a dual flat coil, wherein the generally planar coils are fabricated on the trailing face of the slider so as to lie generally in the cross-track direction. FIG. 8 shows this type of magnetic write head structure in the form of a dual pancake coil with coil portions 25a, 25b with the electrical current direction being into the paper in the coil cross-sections with an "X" and out of the paper in the coil cross-sections with a solid circle.

The head carrier 10 and disk 40 have been shown in a non-contact relationship, as in a disk drive with an air-bearing slider where the slider is supported completely out of contact with the disk. However the write pole and optical channel can also be fabricated on a head carrier that has a portion that is in physical contact with the disk, such as a pad that protrudes from the head carrier with only the pad being in contact with the disk.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A head for thermally-assisted recording in a perpendicular magnetic recording layer comprising:
   a head carrier having a recording-layer-facing surface;
   an optical channel for the transmission of radiation to the recording layer, the optical channel being located on the head carrier and having a radiation exit face at the recording-layer-facing surface;
   a write pole substantially surrounding the optical channel and having a pole tip with an end face recessed from the recording-layer-facing surface; and
   an electrically conductive coil for generating magnetic flux in the write pole when electrical current is passed through the coil, the magnetic flux being directed from the pole tip end face to the recording layer.

2. The head of claim 1 wherein the write pole completely surrounds the optical channel.

3. The head of claim 1 wherein the pole tip is tapered from the write pole to the end face.

4. The head of claim 1 wherein the radiation exit face of the optical channel comprises a layer of material substantially reflective to the radiation and having an aperture therein, said aperture size being less than the wavelength of the radiation.

5. The head of claim 4 wherein said layer of reflective material is a metallic film having periodic corrugations.

6. The head of claim 4 wherein the aperture has a shape selected from the group consisting of a C-shape, an H-shape and a bowtie shape.

7. The head of claim 1 further comprising cladding material located between the optical channel and the write pole.

8. The head of claim 7 wherein the cladding material has a thickness at the end face of the pole tip that is thinner than its thickness at other regions of the write pole.

9. The head of claim 1 wherein the coil is a helical coil wrapped around the write pole.

10. The head of claim 1 wherein the coil is a flat coil.

11. The head of claim 1 further comprising a return pole on the head carrier and having an end substantially at the recording-layer-facing surface, the return pole being magnetically coupled to the write pole for providing a return path for magnetic flux from the recording layer.

12. The head of claim 11 wherein said return pole is a first return pole and further comprising a second return pole on the head carrier and having an end substantially at the recording-layer-facing surface, the first and second return poles being located on opposite sides of the write pole.

13. The head of claim 1 further comprising a laser diode on the head carrier for directing radiation to the optical channel.

14. The head of claim 1 wherein the head carrier is an air-bearing slider having an air-bearing surface as the recording-layer-facing surface.

15. The head of claim 1 further comprising a magnetoresistive read sensor on the head carrier.

16. A thermally-assisted perpendicular magnetic recording disk drive comprising:
   a perpendicular magnetic recording disk comprising a substrate, a magnetically-permeable underlayer on the substrate, and a perpendicular magnetic recording layer on the underlayer; and
   the head of claim 1; wherein the head carrier is maintained near the disk with the spacing between the optical channel exit face and the recording layer being less than the wavelength of the radiation.

17. A thermally-assisted perpendicular magnetic recording disk drive comprising:

a perpendicular magnetic recording disk comprising a substrate, a magnetically-permeable underlayer on the substrate, and a perpendicular magnetic recording layer on the underlayer;

a head carrier having a recording-layer-facing surface;

an optical channel for the transmission of radiation to the recording layer, the optical channel being located on the head carrier and having a radiation exit face with an aperture, the exit face being located substantially at the recording-layer-facing surface and both the aperture size and the spacing between the recording layer and the exit face being less than the wavelength of the radiation;

a radiation source for directing radiation to the optical channel;

a write pole on the head carrier and having a tapered pole tip having an end face recessed from the recording-layer-facing surface, the optical channel extending through the pole tip end face; and an electrically conductive coil for generating magnetic flux in the write pole when electrical current is passed through the coil, the magnetic flux being directed from the write pole tip end face to the recording layer.

18. The disk drive of claim 17 wherein the write pole comprises two pole pieces spaced on opposite sides of the optical channel, each pole piece having a pole tip with an end face recessed from the recording-layer-facing surface.

19. The disk drive of claim 17 wherein the write pole substantially surrounds the optical channel.

20. The disk drive of claim 19 wherein the write pole completely surrounds the optical channel.

21. The disk drive of claim 17 wherein the aperture has a shape selected from the group consisting of a C-shape, an H-shape and a bowtie shape.

22. The disk drive of claim 17 further comprising cladding material located between the optical channel and the write pole.

23. The disk drive of claim 22 wherein the cladding material has a thickness at the end face of the write pole tip that is thinner than its thickness at other regions of the write pole.

24. The disk drive of claim 17 wherein the coil is a helical coil wrapped around the write pole.

25. The disk drive of claim 17 wherein the coil is a flat coil.

26. The disk drive of claim 17 further comprising a return pole on the head carrier and having an end substantially at the recording-layer-facing surface, the return pole being magnetically coupled to the write pole for providing a return path for magnetic flux from the recording layer.

27. The disk drive of claim 26 wherein said return pole is a first return pole and further comprising a second return pole on the head carrier and having an end substantially at the recording-layer-facing surface, the first and second return poles being located on opposite sides of the write pole.

28. The disk drive of claim 17 wherein the radiation source comprises a laser diode on the head carrier.

29. A head for thermally-assisted recording in a perpendicular magnetic recording layer comprising:

a head carrier having a recording-layer-facing surface;

an optical channel for the transmission of radiation to the recording layer, the optical channel being located on the head carrier and having a radiation exit face at the recording-layer-facing surface;

a write pole on the head carrier, the write pole comprising two pole pieces spaced on opposite sides of the optical channel, each pole piece having an end face recessed from the recording-layer-facing surface; and an electrically conductive coil for generating magnetic flux in the write pole when electrical current is passed through the coil, the magnetic flux being directed from the write pole end face to the recording layer.

* * * * *